(12) United States Patent
Srinivasa

(10) Patent No.: US 6,988,062 B2
(45) Date of Patent: Jan. 17, 2006

(54) METAMODEL GENERATION ON THE BASIS OF EXAMPLES OF TARGET MODELS

(75) Inventor: Deepak Minakanagurki Srinivasa, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 09/957,163

(22) Filed: Sep. 20, 2001

(65) Prior Publication Data

US 2003/0149552 A1    Aug. 7, 2003

(51) Int. Cl.
*G06F 9/45* (2006.01)

(52) U.S. Cl. .......................... 703/22; 706/47; 717/104

(58) Field of Classification Search .............. 703/2, 703/22; 717/104, 114; 707/46, 47; 719/313
See application file for complete search history.

(56) References Cited

U.S. PATENT DOCUMENTS

| | | | | |
|---|---|---|---|---|
| 5,644,764 A | * | 7/1997 | Johnson et al. | 707/103 R |
| 5,911,074 A | * | 6/1999 | Leprince et al. | 717/100 |
| 6,208,345 B1 | * | 3/2001 | Sheard et al. | 715/853 |
| 6,292,932 B1 | * | 9/2001 | Baisley et al. | 717/114 |
| 6,538,651 B1 | * | 3/2003 | Hayman et al. | 345/419 |
| 6,874,146 B1 | * | 3/2005 | Iyengar | 719/313 |
| 2002/0059566 A1 | * | 5/2002 | Delcambre et al. | 717/146 |
| 2003/0023413 A1 | * | 1/2003 | Srinivasa | 703/2 |
| 2003/0112232 A1 | * | 6/2003 | Georgalas | 345/418 |
| 2003/0131338 A1 | * | 7/2003 | Georgalas | 717/104 |
| 2004/0111464 A1 | * | 6/2004 | Ho et al. | 709/203 |

OTHER PUBLICATIONS

Hawryszkiewycz, I.T. A Metamodel for Virtual Enterprises, IEEE Workshop on Information Technology for Virtual Enterprises, Jan. 2001, pp. 91-97.*

Liu et al., C. Building a Repository for Workflow Systems, IEEE, Technology of Object-Oriented Languages and Systems, Sep. 1999, pp. 348-357.*

* cited by examiner

*Primary Examiner*—Russell Frejd
(74) *Attorney, Agent, or Firm*—Anthony V S England; T. Rao Coca

(57) ABSTRACT

The present invention relates to a method, system and computer program product for generating a metamodel representing a desired modeling environment. The said metamodel is generated on the basis of examples of target models, comprising extracting information required to construct the metamodel, from said examples, and generating a metamodel structure that represents the class of models that all the examples collectively represent.

18 Claims, 12 Drawing Sheets

METAMODEL GENERATION ON THE BASIS OF EXAMPLES OF TARGET MODELS

FIELD OF THE INVENTION

The present invention relates to generating a metamodel that is configurable for any one of several similar modeling environments, characterized in that said metamodel is generated on the basis of examples of target models.

BACKGROUND OF THE INVENTION

An overview of normal modeling systems largely in use, is first presented, followed by the limitations of such systems. An overview of Metamodeling systems is then presented, and how it overcomes the limitations. Finally a note on the focus of the current work is made.

As shown in FIG. 1, conventional-modeling tools (1.1) present the user (1.2) with a graphical user interface (1.1a), and allow him to develop specific models that the software is designed for. For example, a database modeling tool allows the user to create entity-relationship models, while an OOP CASE tool allows the user to create class diagrams, sequence diagrams, collaboration diagrams etc. These systems are built with the knowledge (1.1b) of the types of models (1.3) that the tool will allow the user to develop. Thus, each tool can support a known limited set of models.

Limitations of such systems include:

1. If there are changes in the way the models are created, the knowledge embedded in the software has to be updated. Since this knowledge is an inherent part of the software, this needs modification of the code, recompilation and possibly re-linking, before the software is rendered for use with the required modifications.
2. There could be a need to support variations in the way in which the models are created. For example, the workflow modeling done by company A could be different from the way Company B does it. It depends on the particular company and their specific needs, although both of them are basically doing the same activity, namely, defining workflow for business processes.

Metamodeling tools remedy the above limitations by providing a system which . . .

a. Allows the user to configure the modeling system with a modeling environment, which constitutes a metamodel (or definitions), describing the kinds of models that can be created by the tool.
b. Once the modeling system is configured for a particular modeling environment, it allows the user to create models that are instances of the metamodel (i.e., the models that are created by the user should conform to the definitions provided). The modelling environment can be changed whenever desired, and the model immediately conforms to the new modelling environment.
c. Once the user creates the models, they can be validated to check the integrity of the models and can be persisted if the validation succeeds, or the relevant error messages are given.
d. The system developed thus is reusable at different levels and highly extensible.

FIG. 2 shows the general structure of such a system. The strategy employed in this system is to take the "knowledge" (2.1) of the types of models out of the system, and let the system only have "meta-knowledge" (i.e., knowledge about the knowledge of the types of models) (2.2a). These will be used by the system to dynamically acquire the knowledge about a particular class of models (i.e., when the user configures the system), and then let the user (2.3) create models conforming to the definitions provided by the acquired knowledge using a GUI (2.2b). Thus, the system behaves according to the configured modeling environment, which not only includes the semantic information about the types of models that can be created (2.4), but also the visual aspects of the models.

The complexity in using metamodeling tools arises from the mechanism for providing the metamodeling system with the knowledge about a modeling environment. Specifically, the following requirements need to be addressed:

1. How to represent the knowledge about a modeling environment?
   What are the node-types that can appear in models?
   How many nodes of each type can appear in the models?
   What are the edge types that can appear?
   The multiplicity and directionality of the edges.
2. How to configure the system with this information?
3. How does the system use the provided information to validate the models created by the user?

Answering all the above mentioned questions precisely for a particular modeling environment (like OOP CASE environment, or a Business Process Reengineering environment) is difficult. It often leads to errors and unforeseen situations occur during modeling, which may lead to legal models being rejected by the system. Existing metamodeling systems do not provide an effective and simple mechanism for addressing these issues.

THE OBJECT AND SUMMARY OF THE INVENTION

The object of this invention is to avoid the above drawbacks by using examples for constructing the metamodel automatically.

To achieve the said objective this invention provides a method for generating a metamodel representing a desired modeling environment, characterized in that said metamodel is generated on the basis of examples of target models, comprising:

extracting information required to construct the metamodel, from said examples, and
generating a metamodel structure that represents the class of models that all the examples collectively represent.

The said extraction is performed by:

viewing each example as a directed multigraph, and
transforming each said multigraph into strings of symbols that encode the information about the model.

The said metamodel structure is generated by constructing several finite automata to accept said extracted information.

The said directed multigraphs are created by:

identifying nodes and edges and their types occurring in each said example,
assigning a unique id to each said node and edge, and
ordering said ids in a defined sequence.

The said strings of symbols are constructed so as to represent the occurrence and type of nodes as well as the relationships between them in an ordered manner.

The said examples, including positive examples that provide instances of correct behaviour.

The said examples further include negative examples that provide instances of incorrect behaviour.

The said positive examples are used to create finite automata that collectively form a generalization machine that describes the set of rules that define the required behaviour of said metamodel.

The said negative examples are used to create finite automata that collectively form a specialization machine that describes the set of desired exceptions to a set of rules defining the required behaviour of said metamodel.

The present invention further provides a system for generating a metamodel representing a desired modeling environment, characterized in that said metamodel is generated on the basis of examples of target models, comprising:
means for extracting information required to construct the metamodel, from said examples, and
means for generating a metamodel structure that represents the class of models that all the examples collectively represent.

The said means for extraction including:
means for viewing each example as a directed multigraph, and
means for transforming each said multigraph into strings of symbols that encode the information about the model.

The said metamodel structure is generated by means for constructing several finite automata to accept said extracted information.

The said directed multigraphs are created by;
means for identifying nodes and edges and their types occurring in each said example,
means for assigning a unique id to each said node and edge, and
means for ordering said ids in a defined sequence.

The said strings of symbols are constructed so as to represent the occurrence and type of nodes as well as the relationships between them in an ordered manner.

The said examples, including positive examples that provide instances of correct behaviour.

The said examples further include negative examples that provide instances of incorrect behaviour.

The said positive examples are used to create finite automata that collectively form a generalization machine that describes the general set of rules defining the desired behaviour for said metamodel.

The said negative examples are used to create finite automata that collectively form a specialization machine that describes a set of desired exceptions to a set of rules defining the required behaviour of said metamodel.

The present invention further provides a computer program product comprising computer readable program code stored on computer readable storage medium embodied therein for generating a metamodel representing a desired modeling environment, characterized in that sad metamodel is generated on the basis of examples of target models, comprising:
computer readable program code means configured for extracting information required to construct the metamodel, from said examples, and
computer readable program code means configured for generating a metamodel structure that represents the class of models that all the examples collectively represent.

The said computer readable program code means configured for extraction including:
computer readable program code means configured for viewing each example as a directed multigraph, and
computer readable program code means configured for transforming each said multigraph into strings of symbols that encode the information about the model.

The said metamodel structure is generated by computer readable program code means configured for constructing several finite automata to accept said extracted information.

The said directed multigraphs are created by:
computer readable program code means configured for identifying nodes and edges and their types occurring in each said example,
computer readable program code means configured for assigning a unique id to each said node and edge, and
computer readable program code means configured for ordering said ids in a defined sequence.

The said strings of symbols are constructed so as to represent the occurrence and type of nodes as well as the relationships between them in an ordered manner.

The said examples, including positive examples that provide instances of correct behaviour.

The said examples further include negative examples that provide instances of incorrect behaviour.

The said positive examples are used to create finite automata that collectively form a generalization machine that describes the general set of rules defining the desired behaviour for said metamodel.

The said negative examples are used to create finite automata that collectively form a specialization machine that describes a set of desired exceptions to a set of rules defining the required behaviour of said metamodel.

In a nutshell, there are two phases of operation—training and production. During training, the user provides several examples, basically of two types—Positive and Negative. These examples are collected and each example is transformed into a set of strings. A set of languages (for node types and edge types) and the corresponding machines, which accept these languages form the metamodel for the modeling environment. A unique approach for constructing Generalization Machine and a composite Specialization Machine for each language is taken, in order to tackle the Generic-Specific dilemma. Positive examples are used to construct the Generalization Machine and Negative examples are used to construct a Specialization Machine. These machines are then used to validate the models during production.

BRIEF DESCRIPTION OF THE DRAWINGS

The invention will now be described with reference to the accompanying drawings.

DETAILED DESCRIPTION

Figure 1:
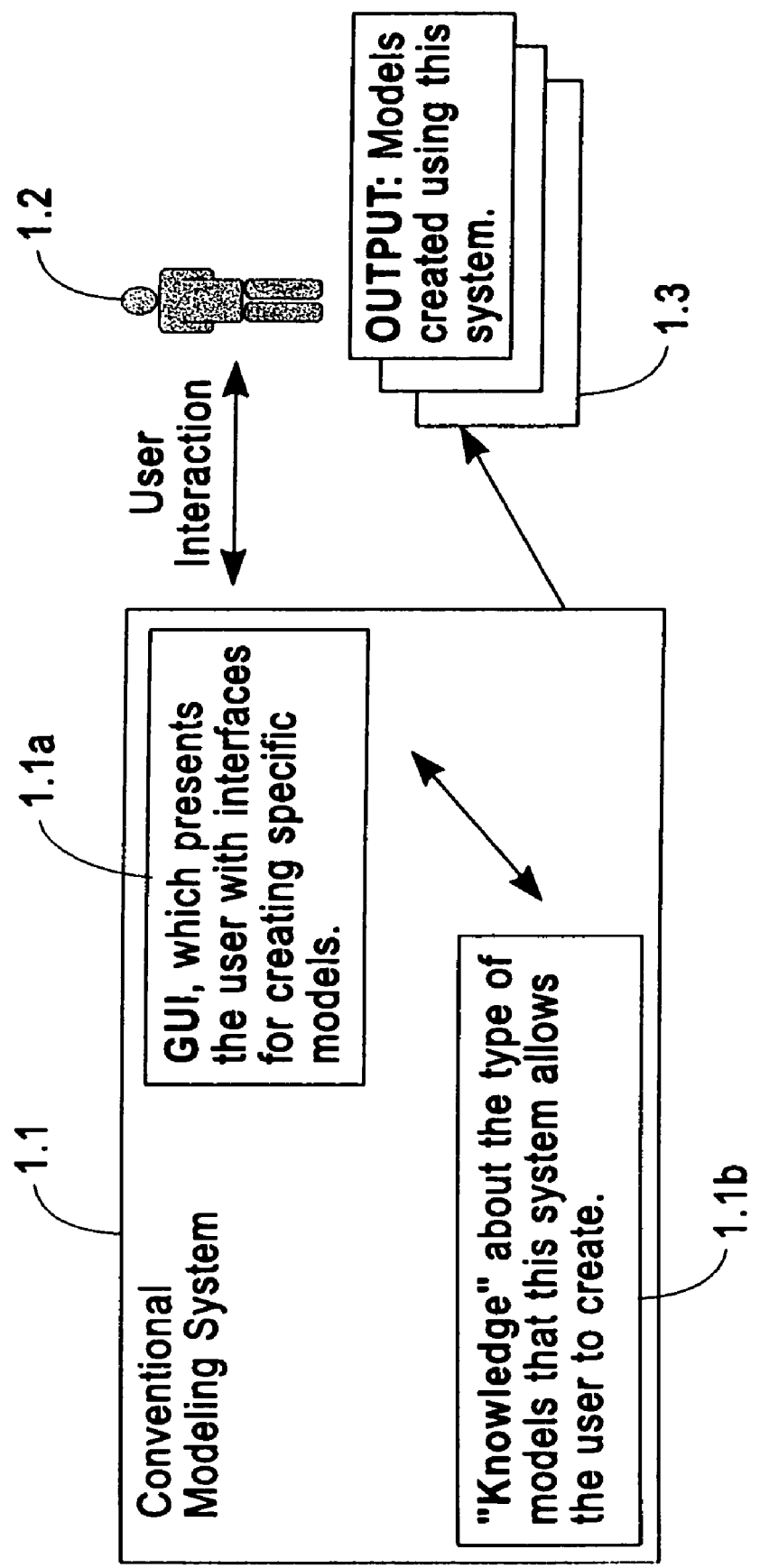
FIG. 1 shows the prior art using conventional modeling.
Figure 2:
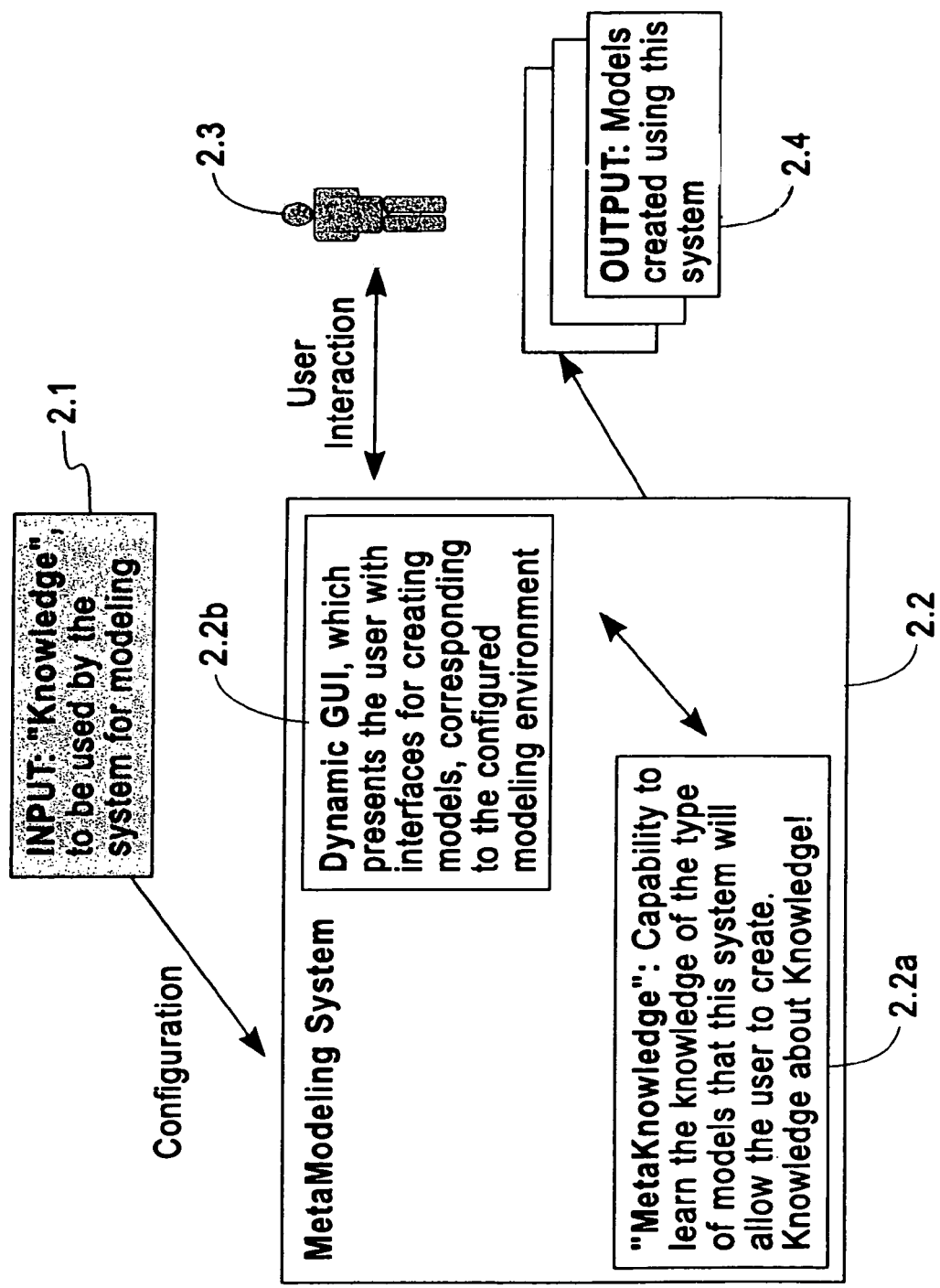
FIG. 2 shows the prior art for metamodeling.

FIGS. 1 and 2 are explained in the background of the invention.

Figure 3:
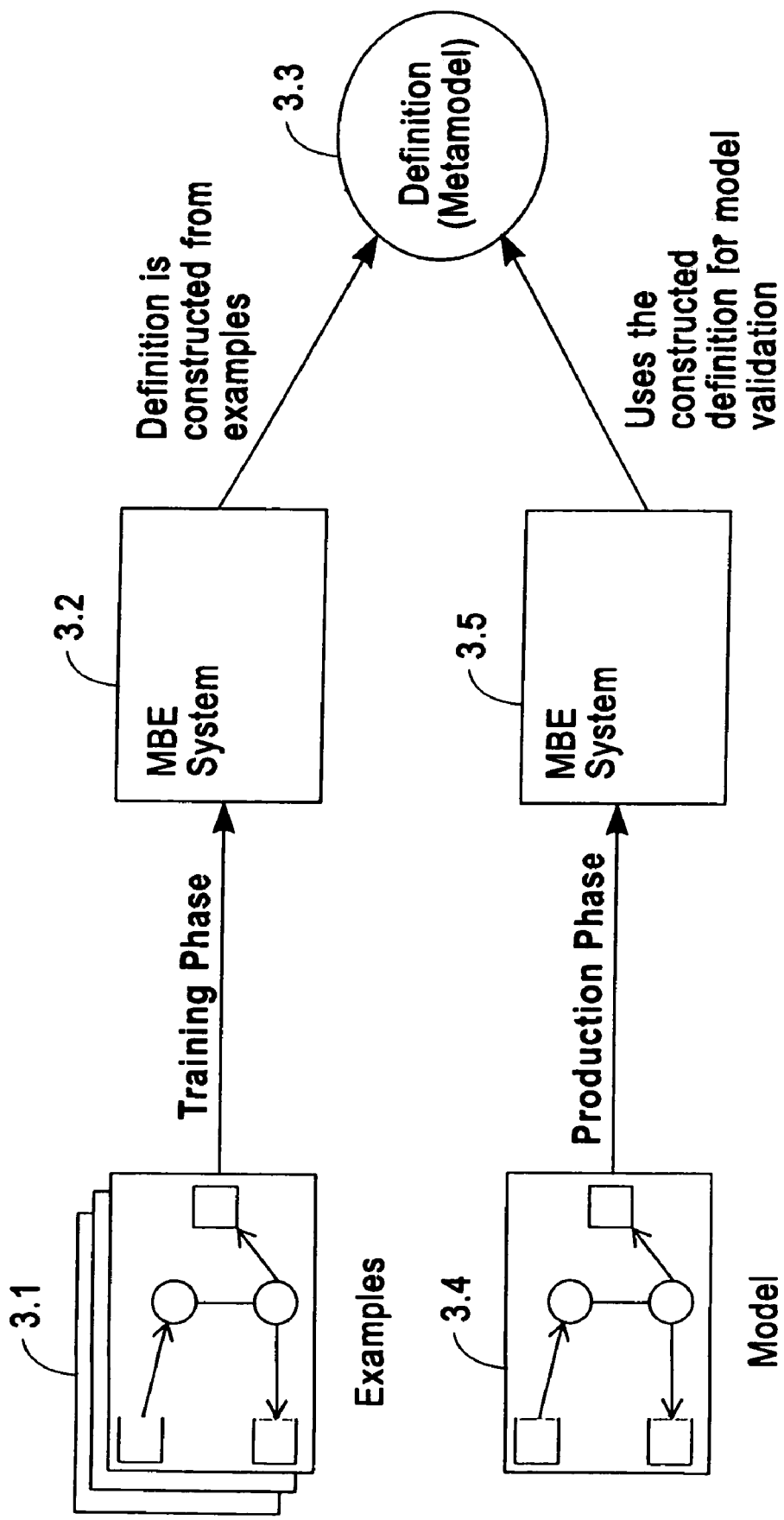
FIG. 3 shows the basic operation of current invention.

Referring to FIG. 3, there are two phases in which a Metamodeling by Example (MBE) system operates:

Training Phase: This is the initial phase, in which a series of examples (3.2) are presented one after another to the system (3.2). The system examines each example and extracts the information required to construct the definition/metamodel (3.3), which represents the class of models that all the examples collectively represent.

Production Phase: The normal operation of the software, wherein the user is allowed to create models for the environment for which the system (3.5) is trained. The models (3.4) that are created are validated by using the metamodel that was generated during the training phase.

Figure 4:
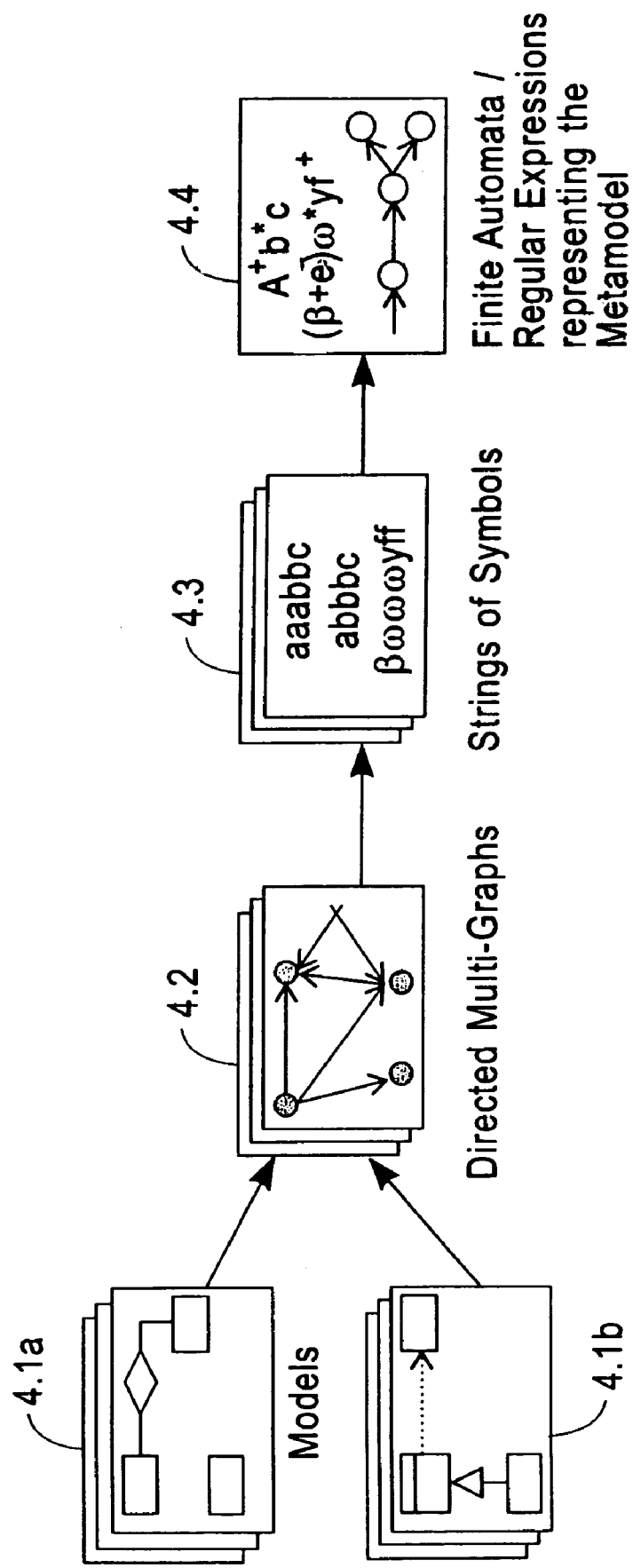
FIG. 4 shows the operation during training.

FIG. 4 describes the learning from examples method of the system:

As each example [4.1(a) and 4.1(b)], of a particular modeling environment is presented to the system it is converted into a series of directed multigraph representations (4.2). Each directed multigraph is then translated into a set of symbol strings (4.3). As a final step the symbol strings are used to construct a set of finite automata (4.4) or 'language' that defines the modeling behaviour.

Figure 5:
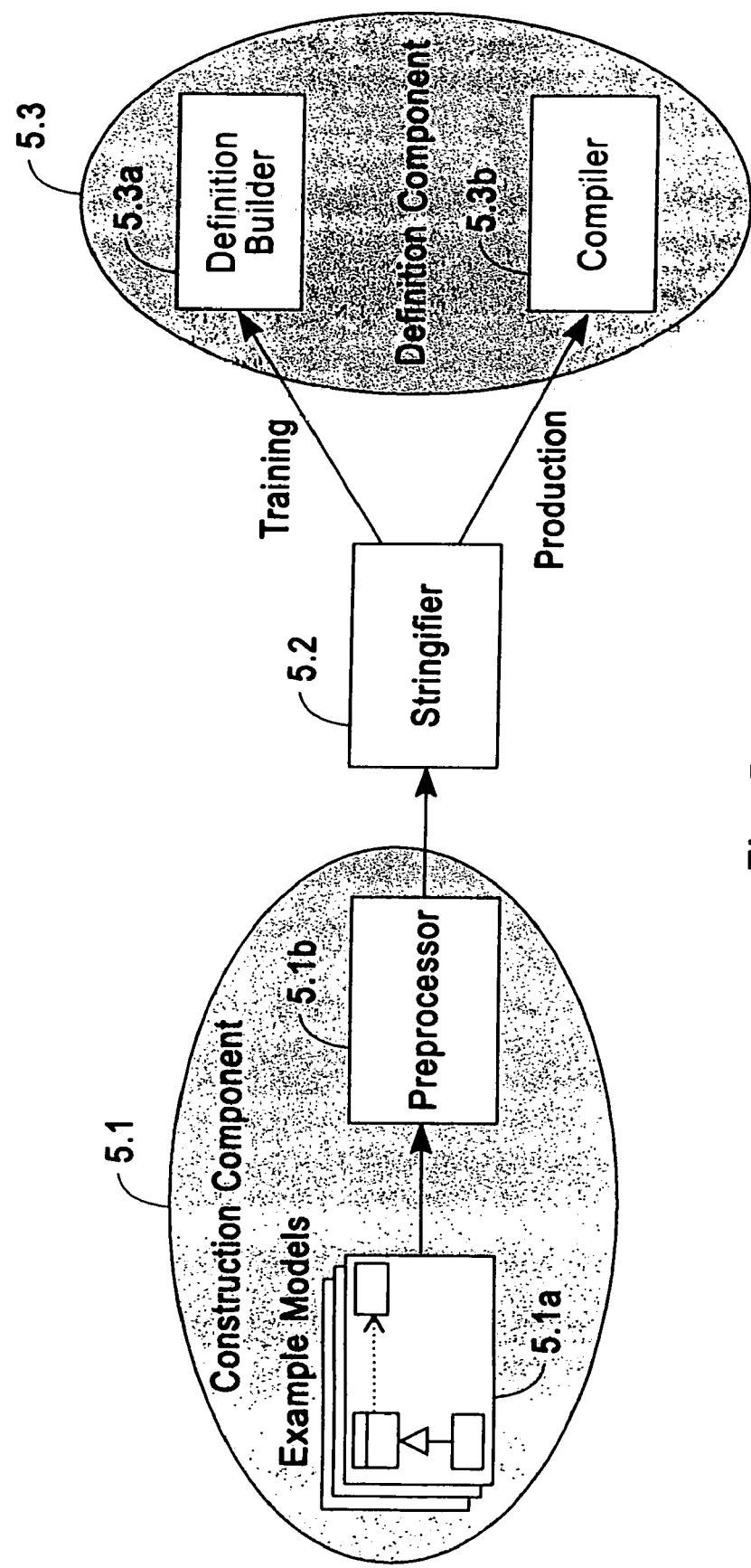
FIG. 5 shows one preferred embodiment of the invention.

A basic architecture for the proposed system is given in FIG. 5:

A construction component (5.1) provides the required interface for the user to create example models (5.1a) during training, and the actual models during production. A preprocessor module (5.1b) is responsible for transforming the models into graphs. The preprocessor operates as follows:

The system starts with no node-types or edge-types registered for a given modeling environment. As the user creates examples during training, nodes, edges and their types are created. A unique id is associated with every new node/edge type and an icon (the way in which the nodes or edges of that type will be rendered on the screen) is registered for that type in the GUI. The preprocessor component ensures the following:

1) The ids that are associated with the node/edge types are unique and can be ordered i.e. if 'a' and 'b' are any two distinct type ids, either a<b, or a>b are true. Typically, letters from English alphabet are used for node-types and letters from the Greek alphabet are used for edge-types.
2) The integrity of type-ids is maintained across examples.

A Stringifier component (5.2) transforms each graph into a series of strings. The entire graph is scanned and each occurrence of a node and its type is added to a string in the sequence in which it is encountered in the graph. Each node is then considered and two strings, one representing all incoming edges and the other representing all outgoing edges are generated. Each string includes the type of each edge. The Stringifier component generates several strings for each model:

1. One string representing the occurrence of node-types in the model, known as the "the node string". The "node string" is a singleton for a model.
2. Two strings per node representing the occurrence of incoming and outgoing edge types. These are known as "in edge string" and the "out edge string". The 'in edge string' represents the occurrence of incoming edge types to a node type, and the 'out edge string' represents the occurrence of out going edge types from a node type. The edge strings are associated with a node type.

The set of strings is used by a definition component (5.3) containing a Definition Builder module (5.3a) to construct the metamodel during the training phase. A metamodel is a set of finite automata that operates in accordance with a set of definitions of behaviour. The set of behaviour definitions are captured in a set of definition languages. The languages specify the structure and behaviour of the model in terms of strings. The first of these languages is called "Node Language". This language defines all valid node strings. Each node type in turn has two languages called "In Edge Language" and "Out Edge Language". The "In-Edge Language" defines valid "in-edge" strings for that particular node type, and the "Out-Edge Language" defines all valid out-edge strings for that node type.

Thus, if there are 'N' node types in a modeling environment, there are (2N+1) languages, where 2N languages are for edges and 1 language is for the nodes. The finite automata are built to accept these languages.

Once the definition is learnt during training, a Compiler module (5.3b) in the Definition component (5.3) stores the metamodel constructed and uses it to validate the models produced by the user during production.

Figure 6:
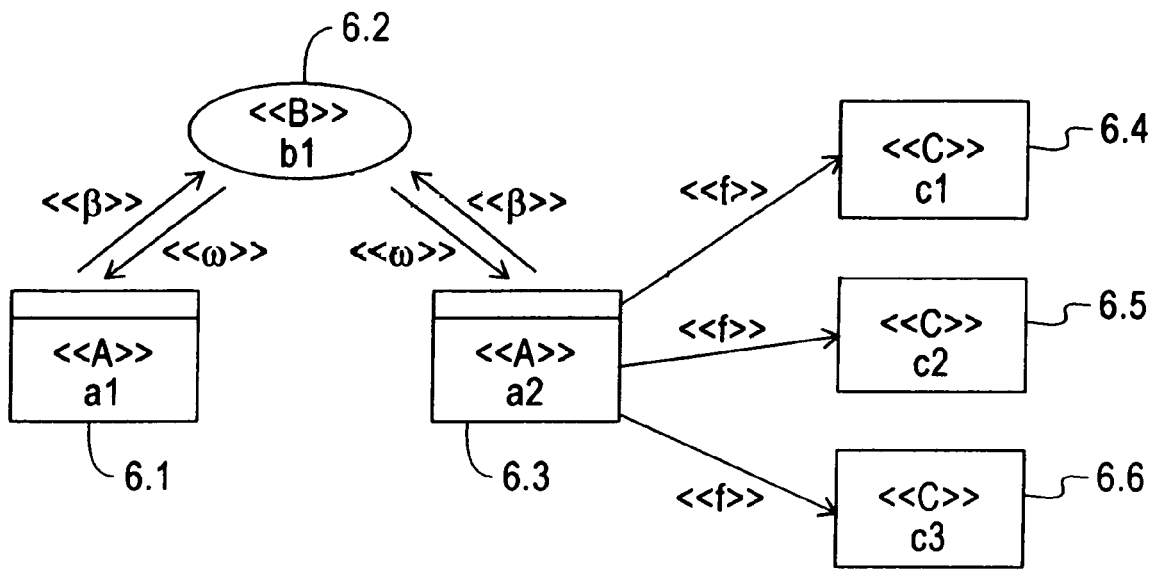
FIG. 6 illustrates an example of transformation of a input example into strings.

FIG. 6 shows an example of 'node string' generation. For the example graph the 'node string' is ABACCC as indicated by blocks 6.1, 6.2, 6.3, 6.4, 6.5 and 6.6. This single string for the entire model contains information about the type and sequence of occurrence of nodes.

Figure 7:
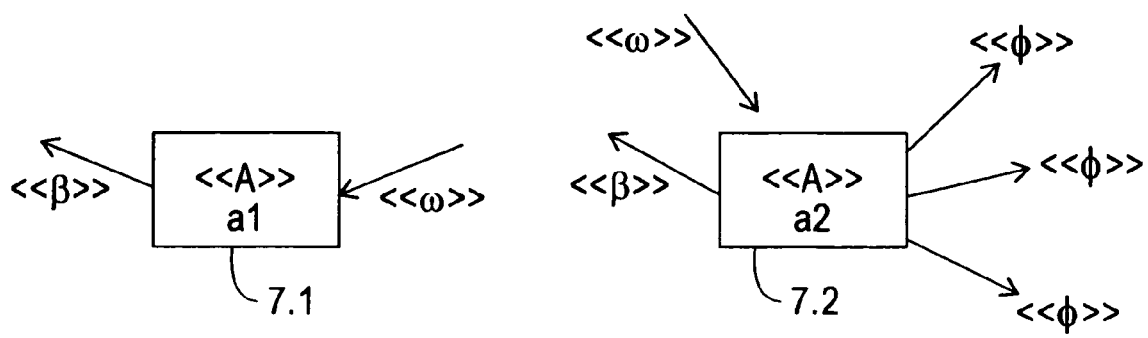
FIG. 7 shows examples of nodes in a directed multigraph.

FIG. 7 shows two examples of 'In edge string' and 'out edge string' generation. In (7.1) node 'A' has "In-edge string" (A, in, ω) and 'out edge string' (A, out, β). In (7.2) node 'A' has 'In edge string' (A, in, ω) and 'Out Edge Sting' (A, out, βϕϕ)

Figure 8:
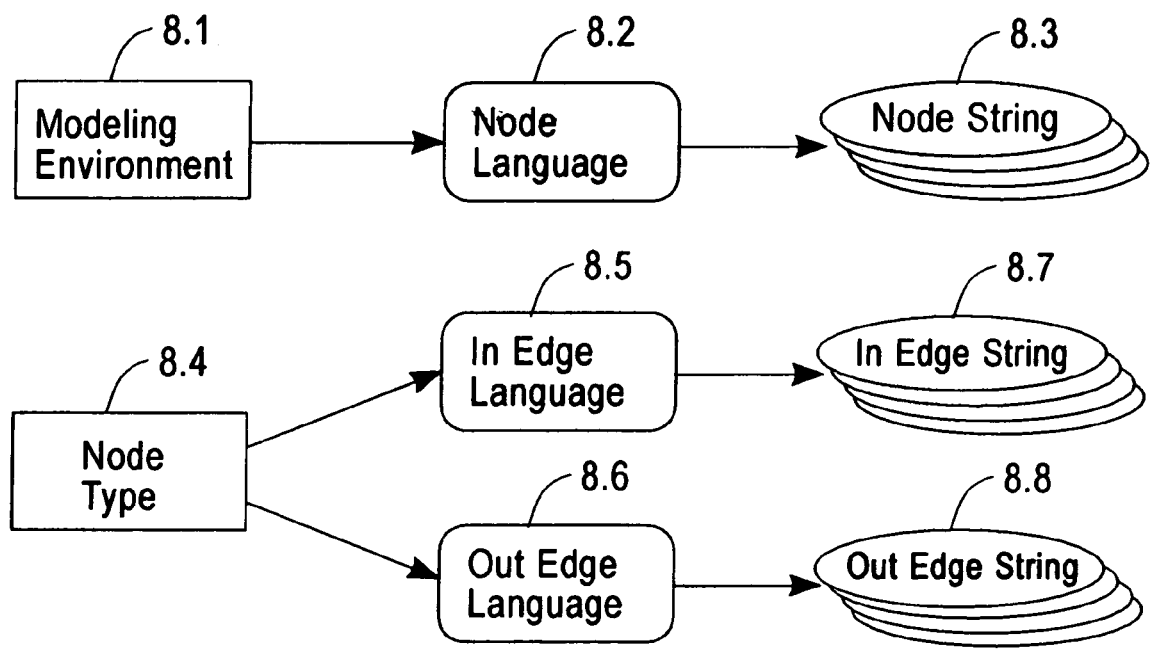
FIG. 8 shows a relation between Modeling Environment, Types, Languages, and Strings

FIG. 8 describes the relationship between the modeling Environment (8.1) and the associated node Language (8.2) with an associated Node String (8.3). Each Node type (8.4) has associated In-edge Language (8.5) and Out-edge Language (8.6). The In-edge language has an associated In-edge string (8.7) while the Out-edge Language has an associated Out Edge String (8.8).

Figure 9:
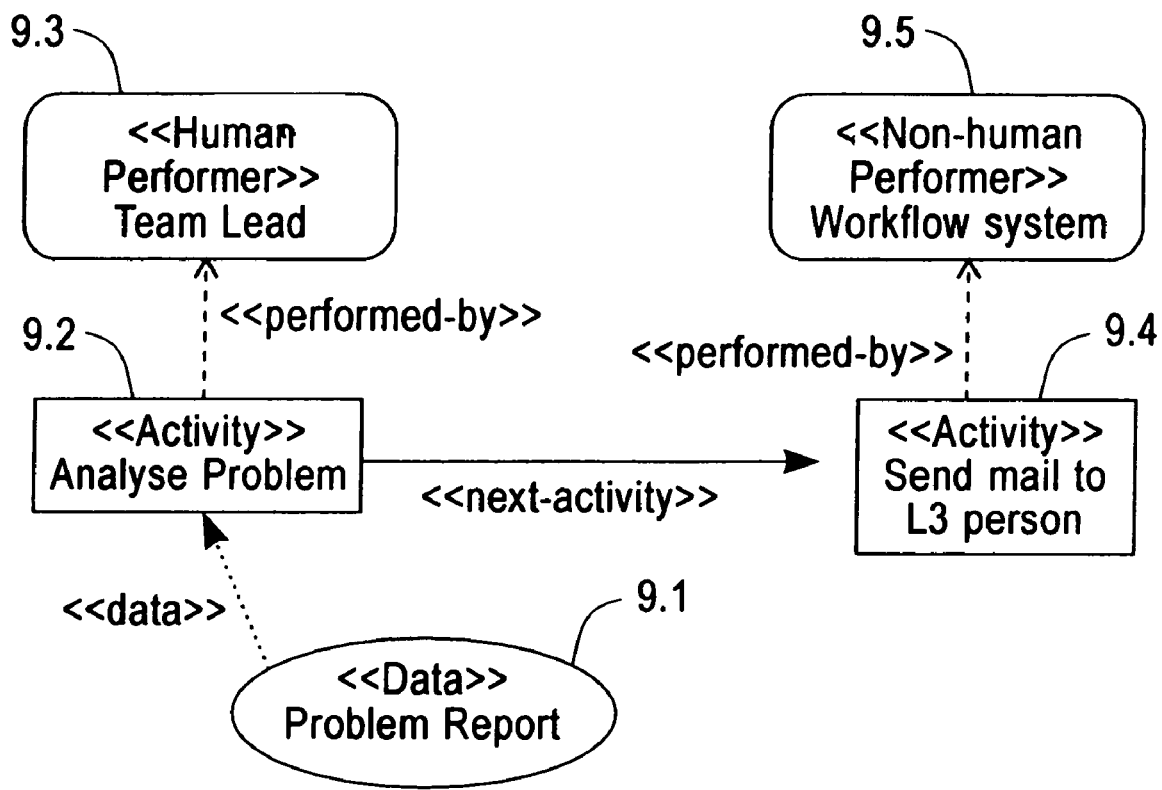
FIG. 9 shows an example to illustrate the generic-Specific problem.

FIG. 9 shows the approach taken in learning from examples using a workflow model as a case. Data, such as a Problem Report (9.1) triggers an activity related to analysis of the problem (9.2) involving human performers headed by a Team Leader (9.3). the Problem analysis activity also generates a mailing activity (9.4) performed automatically by the Workflow System (9.5).

There are two extreme approaches to learn or extract the class/definition from examples, namely the Generic and the Specific approaches. Some of the assertions that can be made about the definition from the above example using these two approaches are listed below:

The Generic Approach:
1. There can be one or more Activities in a work flow model.
2. An activity may or may not lead to another activity, i.e. be related by the relation "next activity".
3. An activity may have zero or one input data associated with it.

4. An activity is associated with zero or one human performer. An activity is associated with zero or one non-human performer. This means that models, where an activity is associated with both human and non-human performers, i.e. with two performers, or activity with no performer associated are also valid.

The Specific Approach:

1. There can be only two activities in a workflow model.
2. Only one activity can lead to another activity through the "next activity" relation.
3. Only the activity that leads to another activity has input data associated with it, and should be performed by a human performer.
4. A non-human performer should always perform the activity that has "next activity" as an incoming edge.
5. An activity is either associated with a human performer or a non-human performer; but not both or none.

In these two approaches, the Generic Approach is superior. It may be desirable that the assertion 4 of the Generic Approach was not made by the system, and in fact be replaced by assertion 5 of the Specific Approach.

Figure 10:
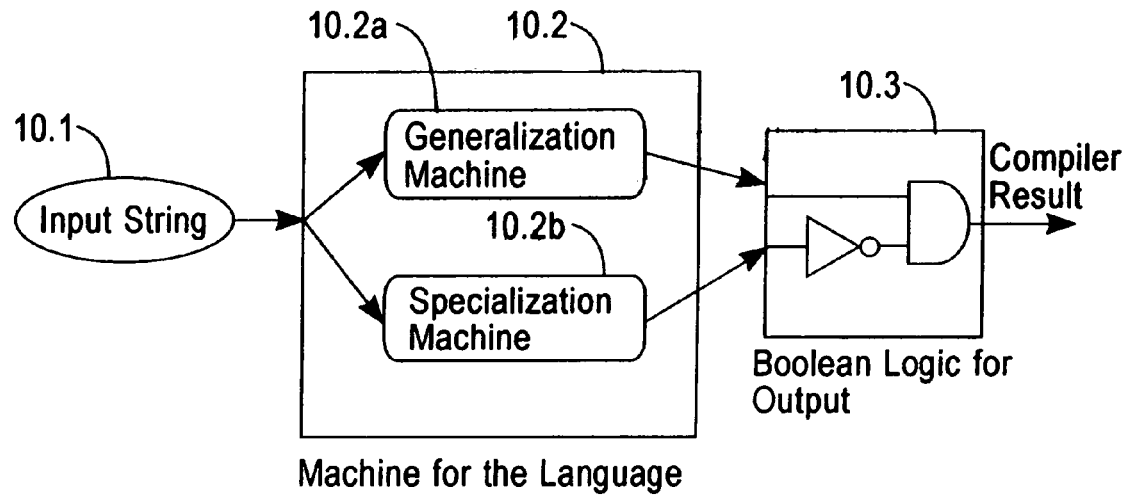
FIG. 10 illustrates the process of generating a metamodel using the positive and negative examples.

FIG. 10 shows the use of 2 types of examples—namely Positive and Negative. Positive examples are those in which everything is perfectly correct. Negative examples are those in which certain aspects are wrong. Moreover, negative examples need not be complete, but present only those sections of the model that highlight the negative feature. The positive examples are used to generalize the definition by taking the generic approach. Negative examples try to remove certain illegal models, which had become valid due to over-generalization. Thus, every language that was mentioned above would have two machines associated with it, namely—a Generalization Machine and a Specialization Machine. The Generalization Machine is constructed using the positive examples, while the Specialization Machine is constructed using the negative examples.

To construct the Specialization Machine, the Specific approach is not taken. In fact the approach is no different than that for the Generalization Machine. The reason for calling it Specialization Machine is that it removes several models from the language that the Generalization Machine would have otherwise accepted, thus specializing the definition learnt.

The input string (10.1) for a language is fed to both the Generalization Machine (10.2a) and the Specialization Machine (10.2b) during compilation. It is assumed that these machines output a '1' if they accept the string, and a '0' if they reject the string. Under these conditions, the compilation would be successful when the Generalization Machine accepts the string and the Specialization Machine rejects the string, as indicated by the boolean logic (10.3). This is the reason for constructing the Generalization Machine from positive examples and the Specialization Machine from negative examples.

The Generalization Machine: The Generalization Machine is a type of Deterministic Finite Automata termed Deterministic Ordered Finite Automata (DOFA). This finite automaton always deals with strings that are ordered using a set of states are also ordered and the alphabet is also virtually ordered. The transition function is modified to reflect this ordering.

A formal description of the Generalization Machine $M_G$ is now presented. $M_G$ can be represented as a 5 tuple $M_G(Q, \Sigma, q_0, \delta, F)$ where . . .

1. Q is a well-ordered set of states.

That is, $\forall x, y \in Q$, if $x \neq y$ then $x<y$ or $x>y$; and in any non-empty subset of Q, there is always a smallest element. The condition for $x<y$ $\forall x,y \in Q$, and some more definitions regarding this will be stated later.

2. $\Sigma$ is the well-ordered set of input symbols. Let us call it the 'Virtual Alphabet'.

Again, $\forall$ $\alpha, \beta \in \Sigma$, if $\alpha \neq \beta$ then $\alpha<\beta$ or $\alpha>\beta$; and in any non-empty subset of $\Sigma$, there is always a smallest element.

A string is a finite sequence of symbols (from the alphabet) juxtaposed.

Let us define a set $\Sigma^*$ as the set of strings that can possibly be accepted by a DOFA as follows.

a. $\forall$ $a \in \Sigma$, $a \in \Sigma^*$
   b. $\forall a, b \in \Sigma$, $ab \in \Sigma^*$ iff $a \leq b$
   c. $\forall x, w \in \Sigma^*$ & $a, b \in \Sigma | w=bx$, then $aw \in \Sigma^*$ iff $a \leq b$
   d. The only elements in $\Sigma^*$ are those that can be produced from the three rules above.

Let '$\Omega$' be a special input symbol called 'Bypass Symbol'.

Let $\Sigma'=\Sigma \cup \{\Omega\}$ be the 'Actual Alphabet' of the machine $M_G$. Here $\Sigma'$ is not ordered.

The specialty of this symbol $\Omega$ is that it does not appear in any of the possible input strings that can be accepted by a DOFA (as defined by $\Sigma^*$ above), yet finds a place in the 'Actual Alphabet' and thus in $\delta$ (the transition function to be described later). This symbol is used for bypassing the dead-ends.

Two important points to be noted are as follows.

a. $\Sigma$ is called the 'Virtual Alphabet', because for the outer world, $M_G$ accepts strings only in $\Sigma^*$, which does not contain $\Omega$ as a symbol in any string. Yet, the machine internally has $\Omega$ as an input symbol in the transitions. Thus $\Sigma'$ is the 'Actual Alphabet'.

b. While characterizing $M_G$ as a 5 tuple $M_G(Q, \Sigma, q_0, \delta, F)$, the 'Virtual Alphabet' $\Sigma$ is used and not the 'Actual Alphabet' $\Sigma'$ because $\Sigma'$ is derivable from $\Sigma$. It is noted that $\Sigma$ is not derivable from $\Sigma'$ because although $\Sigma=\Sigma'-\{\Omega\}$, the ordering in $\Sigma$ is not maintained. Therefore, the machine is characterized by the 'Virtual Alphabet' $\Sigma$.

3. $q_0 \in Q$, and is a designated starting state.

4. $\delta$ is the transition function. It is a mapping from $Q \times \Sigma'$ to Q. $\delta(q, a)$ is the state to which the machine at state 'q' should go to after reading the input symbol 'a' from the input tape. The head of the finite control then moves one symbol to the right. Thus, $\delta$ can be viewed as a set of ordered pairs where the first element of the ordered pair is an ordered pair of a state and an input symbol, and the second element of the ordered pair is a state.

Thus, $((q, a), p) \in \delta$, if the machine $M_G$ in state 'q' transitions to state 'p' after reading an input symbol 'a' from the input tape. Here it is noted that p, $q \in Q$ and $a \in \Sigma'$.

With this transition function, the automaton behaves like a normal Deterministic Finite Automaton. However, the applicability of the following rule makes this automaton a DOFA.

Bypass – Rule ('$q$' is the current state and '$a$' is the current input symbol)

if $((q, a), p) \notin d \forall p \in Q$

&

$\forall x \in S \ \& \forall m \in Q, \nexists ((q, x), m) \in d \mid x > a(\text{in } S)$

&

$((q, \Omega), p) \in d \forall p \in Q$ then apply the transition $d(q, \Omega) = p$ and move to state '$p$'.

This behavior is equivalent to inserting an input symbol '$\Omega$' just before '$a$' in the input tape. After applying the transition $\delta(q, \Omega)=p$ and moving to the state '$p$', the input symbol '$a$' still remains to be processed because the symbol that was processed in the last transition was the bypass symbol $\Omega$ imagined to be inserted before '$a$'.

5. FQ. is the set of final states.

Another transition function $\delta'$ is defined as follows.

$\delta'$ is a mapping from $Q \times \Sigma^*$ to $Q$ such that

1. $\delta'(q, w) = \delta(q, w)$ if $q \delta Q \ \& \ w \in \Sigma^* \ \& \ |w|=1$
2. $\delta'(q, wa) = \delta(\delta'(q, w), a) \ q \in Q, \ w \in \Sigma^* \ \& \ a \in \Sigma$.

Now, the ordering in set $Q$ before is defined as follows.

$\forall p, q \in Q, \ p < q \ \text{iff} \exists w \in \Sigma^* \mid \delta'(q, w) = p$.

Two more entities pertaining to set $Q$ are defined as follows.

$\forall p, q \in Q, \ \text{successor}(p) = q \ \text{iff} \ p < q \ \& \ \nexists r \in Q \mid p < r < q$ $\forall p, q \in Q, \ \text{predecessor}(q) = p \ \text{iff} \ p < q \ \& \ \nexists r \in Q \mid p < r < q$ The above definitions imply that if successor(p)=q then predecessor(q)=p.

Figure 11:
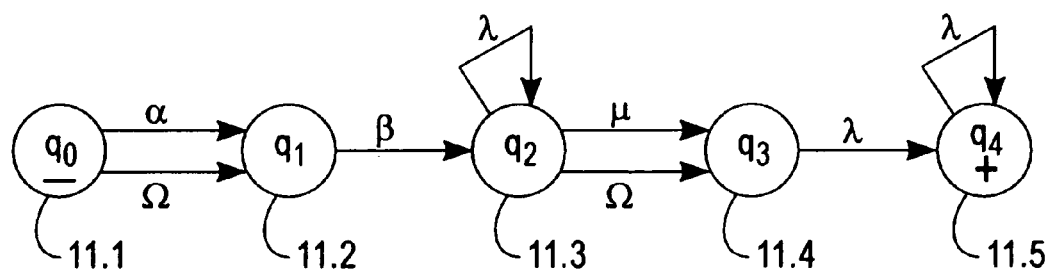
FIG. 11 shows a sample DOFA.

An informal description of the machine $M_G$ is illustrated by FIG. 11, which shows a sample DOFA, instead of dealing with sets and propositions alone.

Here, $q_0$ (11.1) is the starting state indicated by a '−' sign, and $q_4$ (11.5) is a final state indicated by the '+' sign. Thus $Q = \{q_0, q_1, q_2, q_3, q_4\}$. The ordering is $q_0 < q_1 < q_2 < q_3 < q_4$ because there are no transitions from $q_1$ to $q_0$, or from $q_3$ to $q_2, q_1, q_0$ and so on. This is why $Q$ is a well-ordered set. As can be seen from the diagram, the transitions are happening on symbols like $\alpha, \beta, \gamma, \mu, \lambda$ and $\Omega$. These together forms the 'Actual Alphabet'. So, $\Sigma' = \{\alpha, \beta, \gamma, \lambda, \mu, \Omega\}$. The 'Virtual Alphabet' $\Sigma = \{\alpha, \beta, \gamma, \mu, \lambda\}$. The meaning of $\Sigma$ being well ordered is that $\alpha < \beta < \gamma < \mu < \lambda$. It actually means that there will be no string accepted by any DOFA that has $\alpha$ after $\beta$ or $\gamma$ or $\mu$ or $\lambda$ and so on. Hence strings like $\beta\alpha\lambda\mu$ are automatically invalid.

The transitions for this example machine are $\delta(q_0, \alpha) = q_1$
$\delta(q_0, \Omega) = q_1$
$\delta(q_1, \beta) = q_2$
$\delta(q_2, \gamma) = q_2$
$\delta(q_2, \mu) = q_3$
$\delta(q_2, \Omega) = q_3$
$\delta(q_3, \lambda) = q_4$
$\delta(q_4, \lambda) = q_4$ Also, as an example, $\delta'(q_0, \alpha\beta\gamma\gamma) = q_2$ since the transition graph for this input string starting from $q_0$ terminates in, $q_2$ after the string is parsed. This is essentially the meaning of $\delta'$.

In a bypass condition, consider an input string $\alpha\beta\gamma\gamma\lambda$ for the example machine. In order to parse this input string, the following sequence of transitions is used.

| Input String | Transition |
| --- | --- |
| (1) αβγγλ | $\delta(q_0, \alpha) = q_1$ |
| (2) αβγγλ | $\delta(q_1, \beta) = q_2$ |
| (3) αβγγλ | $\delta(q_2, \gamma) = q_2$ |
| (4) αβγγλ | $\delta(q_2, \gamma) = q_2$ |
| (5) αβγγλ | $\delta(q_2, \Omega) = q_3$ (Bypass-Rule) |
| (6) αβγγλ | $\delta(q_3, \lambda) = q_4$ |

Since $q_4$ is a final state, this string will be accepted by the machine. For transitions (3) and (4), the Bypass-Rule $\delta(q_2, \Omega) = q_3$ can not be applied because there exists $\delta(q_2, \gamma) = q_2$; and for (5) the Bypass-Rule $\delta(q_2, \Omega) = q_3$ can be applied because there does not exist $q$, such that $((q_2, \lambda), q)$ is in the set of transitions and also there does not exist any $q$ such that $((q_2, x), q)$ is in the set of transitions and $x \geq \lambda$ (we only have $((q_2, \gamma), q_2)$ and $((q_2, \mu), q_3)$ in $\delta$ and both $\gamma < \lambda$ and $\mu < \lambda$). It is also noted that between transitions (5) and (6), the pointer on the input tape did not move one step to the right. Finally as an example it is noted that successor($q_1$) is $q_2$ and predecessor($q_4$)=$q_3$ and so on.

The Generalization Mechanism: As new examples are presented, new strings are produced. The corresponding DOFA has to be updated suitably to accept the new strings, by generalizing as required. As indicated above, a modeling environment has several languages (1 node language and 2N edge languages for N node types) associated with it. Every language has a generalization machine and a specialization machine. The generalization mechanism applies to all Generalization Machines irrespective of what languages are represented and is applied to progressively build the Generalization Machine during the Training Phase.

The Generalization Mechanism involves parsing the input strings and updating the machine. As already mentioned above, the Generalization Machine is characterized by the 5 tuple. The process attempts to modify each of the elements of the machine as and when required. It may be observed that only the 'Virtual Alphabet' is being updated and not the 'Actual Alphabet' since it is the Virtual Alphabet that characterizes the machine and the Actual Alphabet is derivable from the Virtual Alphabet.

The strings are parsed in sequence. Each string is assumed to be placed on an input tape and is read from left to right traversing the transition graph using the transitions given by $\delta$. Traversal may reach a dead-end state because of the following possibilities. (Let '$d$' be the dead-end state and '$a$' be the current symbol on the input tape.):

1. The machine is still in its initial state (d=$q_0$). The initial state is when Q=$\{q_0\}$, $\Sigma=\{ \}$, F=$\{ \}$, and there are no transitions defined at all.

2. The final state has been reached, while the input tape is not completely parsed (d∈F).
3. There is no $\delta(d, \alpha)$ defined on d and $\alpha$, and Bypass-Rule can not be applied because $\delta(d, \Omega)=q$ transition can not be made because $\exists p \in Q$ & $\beta \in \Sigma | \delta(d, \beta)=p$ & $\beta>\alpha$.
4. There is no $\delta(d, \alpha)$ defined on d and $\alpha$, and Bypass-Rule can not be applied, because $((d, \Omega), p) \in \delta \forall p \in Q$ Once a dead end is reached, the DOFA is updated according to the following rules. (It is noted that except for case IV listed below, in all other cases, the current pointer on the input tape is advanced one symbol to the right after the steps in the corresponding cases are performed):

Case I: If the dead end is reached because of possibility 1.
1. Add an element p to Q such that successor($q_0$)=p.
2. Let $\Sigma=\{\alpha\}$.
3. Let $\delta(q_0, \alpha)=p$.
4. Let $F=\{p\}$.
5. Move the pointer one symbol to the right on the input tape.

Case II: If the dead end is reached because of possibility 2
a) if $\delta(predecessor(d), x)=d$ and $x \neq \alpha$
  1. Add an element p to Q such that successor(d)=p.
  2. Let $\Sigma=\Sigma \cup \{\alpha\}$ such that $x<\alpha$.
  3. Let $\delta(d, \alpha)=p$. If it is the first string being fed to the machine, let $\delta(d, \Omega)=p$.
  4. Let $F=F-\{d\}$, and $F=F \cup \{p\}$.
  5. Move the pointer one symbol to the right on the input tape.

b) if $\delta(predecessor(d), \alpha)=d$ then $\delta(d, \alpha)=d$ and move the pointer one symbol to the right on the input tape.

Case III: If the dead end has been reached because of possibility 3
a) if $\delta(predecessor(d), \alpha)=d$ then $\delta(d, \alpha)=d$ and move the pointer one symbol to the right on the input tape.
b) if $\delta(predecessor(d), x)=d$ and $x \neq \alpha$
  1. Add new state p to Q such that Successor(p)=Successor(d);
     Successor(d)=p;
  2. $\forall \beta \in \Sigma$ & $r \in Q$ replace all $\delta(d, \beta)=r$ by $\delta(p, \beta)=r$.
  3. Let $\Sigma=\Sigma \cup \{\alpha\}$ such that $\alpha>x$ & a $y \in \Sigma | \alpha>y>x$.
  4. Let $\delta(d, \alpha)=p$ & $\delta(d, \Omega)=p$.
  5. Move the pointer one symbol to the right on the input tape.

Case IV: If the dead end has been reached because of possibility 4 let $\delta(d, \Omega)=successor(d)$, and do not move the pointer one symbol to the right on the input tape.

Informally, the generalization machine tries to promote the multiplicity of symbols occurring in the strings as follows . . .

0→1 or * or +

1→+ or *

+→*

Where * means zero or one occurrence and + means one or more occurences.

The rules listed above are graphically represented in the following table:

| Case | Subcase | Extra Condition | Before Rule Application | After Rule Application |
|---|---|---|---|---|
| I | | MG still in initial state |  | 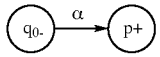 |
| II | a | $x \neq \alpha$ and it is the first string being fed to the machine as an example. |  | 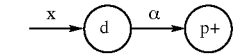 |
| | | $x \neq \alpha$ and it is not the first string | 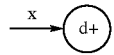 | 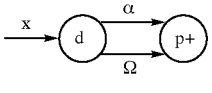 |
| | b | $x = \alpha$ | 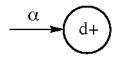 | 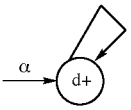 |
| III | a | $x \neq \alpha$<br>$x < \alpha$<br>$y > \alpha$ | 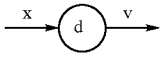 | 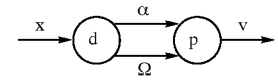 |
| | b | $x = \alpha$<br>$y > \alpha$ | 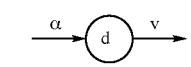 | 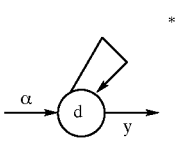 |

-continued

| Case | Subcase | Extra Condition | Before Rule Application | After Rule Application |
|------|---------|-----------------|-------------------------|------------------------|
| IV   |         | y <α<br>x <α    |     | p = successor(d)<br>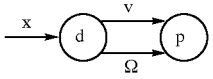 |

The Specialization Machine $M_S$ is very similar to the Generalization machine. This machine is built by using the negative examples. An additional rule for the transition function δ is added, which should be used only during production (and not during training). This rule, which is called s-bypass-rule (for specialization bypass rule), is as follows . . .

∀α, β∈Σ & p, q∈Q, δ(q, α)=q if ((q, α), p)∈δ & ((q, β), p)∈δ|α<β.

During training, $M_S$ is exactly the same as $M_G$. As mentioned earlier, negative examples need not be complete. This implies that the negative examples only highlight the undesirable parts of the model, which gets translated into undesirable types of strings after the transformation. The problem therefore is to ensure that these types of strings do not occur during production.

As an example, consider the following DOFA and the corresponding Regular Expression representing the edge language. (Note that a regular expression is equivalent to a Deterministic Finite Automaton. Hence, a DOFA or the Generalization Machine can be represented by a Regular Expression.)

$(α+Ω)βγ*(μ+Ω)λ^+$

Figure 12:
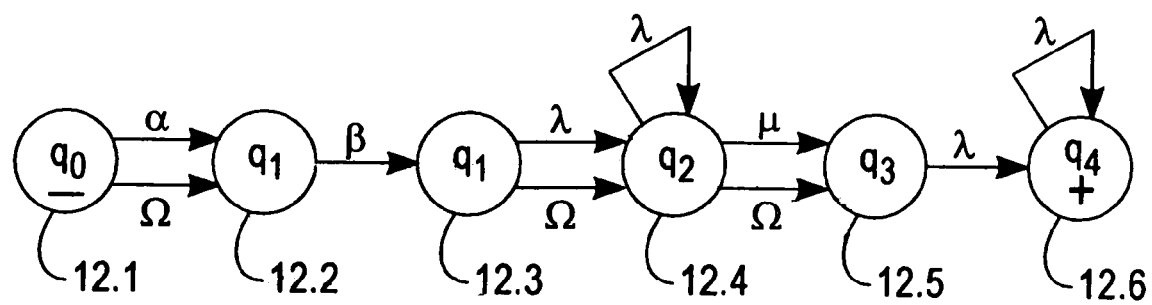
FIG. 12 illustrates an example showing over generalization.

FIG. 12 illustrates an example showing over-generalization. The above generalization indicates that 1. Zero or one occurrence of the edge type α is permitted (as shown against 12.1).
2. The edge type β has exactly one instance for nodes of this node type (12.2).
3. Zero or more edges of type γ may be present (12.3).
4. Zero or one edge of type μ is permitted (12.4).
5. At least one edge of type λ should be present (12.5).

During the Generalization Mechanism, each node and each edge is treated individually. The relations with other edges/nodes and dependencies are not considered, hence over generalization occurs.

Assume that the above DOFA has over generalized, and that the user does not want the edge types α & μ to occur together. In other words, strings like αβγγγμλ and αβμλλλ, which are acceptable in the language $L(M_G)$, which are to be disallowed. The user creates a negative example for a node type in which edges of both type α and μ are present.—a string containing αμ.

The task is to build a machine, which accepts all strings in $L(M_G)$ having both α and μ not necessarily appearing adjacently. This new language is called $L(M_S)$ and the machine which accepts this language is called the Specialization Machine $M_S$. $M_S$ exists primarily to handle these dependencies between different types.

Figure 13:
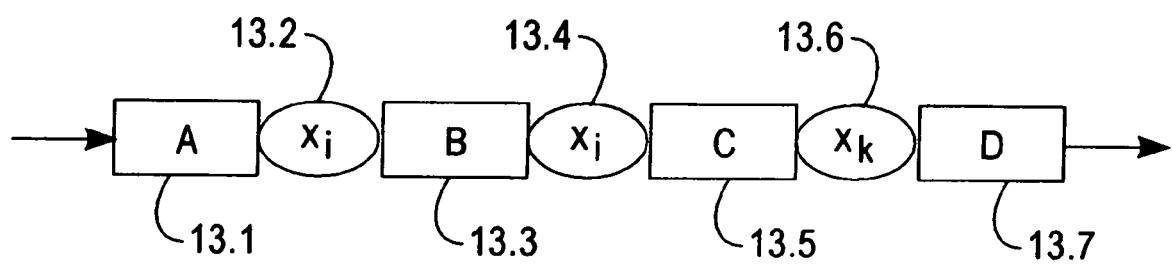
FIG. 13 shows a general structure of a Specialization Machine.

FIG. 13 shows a general structure of a specialization machine.

Suppose $x_i$ (13.2), $x_j$ (13.4), and $x_k$ (13.6) are the three types whose dependencies are handled by this specialization machine. The ovals containing $x_i$, $x_j$, $x_k$ represent that parts of $M_S$ that handle these symbols.

For example,

Part $x_i \rightarrow (x_i + Ω)$

Part $x_j \rightarrow x_j$;

Part $x_k \rightarrow x_k^+$

The other parts of the machine allow any other intermediate symbol to be bypassed by using the s-bypass condition. The box represented by A thus allows all symbols before xi to be discarded. Hence, Box A (13.1)→$(x_1+x_2+ \ldots +x_{i-1})^*$ Box B (13.3)→$(X_{i+1}+X_{i+2}+ \ldots +x_{j-1})^*$ Box C (13.5)→$(x_{j+1}+x_{j+2}+ \ldots +x_{k-1})^*$ Box D (13.7)→$(x_{k+1}+x_{k+2}+ \ldots x_n)^*$ Here the virtual alphabet $Σ=\{x_1, x_2, \ldots x_n\}$ and $1 \leq i<j<k \leq n$.

The Specialization Mechanism, as mentioned before is the same as the Generalization Mechanism. Hence $M_S$ is the same as $M_G$ during training.

A negative feature is an undesirable element that could have possibly been learnt by the system due to over generalization of $M_G$. If a negative feature is associated with a node type it deals with the dependencies between the edges of that node type; or it may be associated with the entire model in which case it will be dealing with the dependencies between the nodes of different types. A single negative feature may be exemplified to the system by means of several negative examples. These negative examples are used to build $M_S$ for that negative feature. There is one $M_S$ for each negative feature. Hence the Specialization Machine is actually made up of several $M_S$, one for each negative feature.

Figure 14:
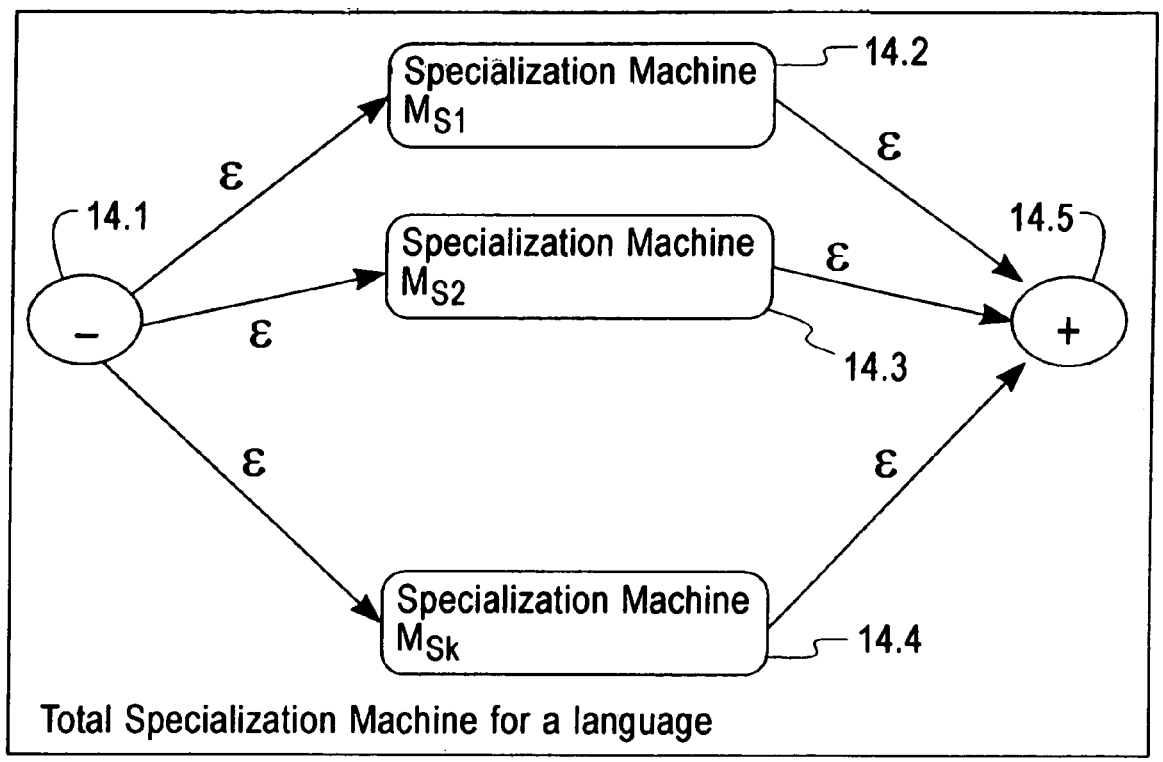
FIG. 14 shows the composite nature of the specialization machine.

FIG. 14, illustrates the composite nature of the specialization machine. The Total Specialization Machine is a Non-Deterministic Finite Automaton due to the existence of ε-transitions. This is required because even if one of the negative features for that language is satisfied, the compilation should fail.

Computer Implementation of the concepts presented here is readily achievable. The Deterministic Ordered Finite Automaton (DOFA), is a specialized Finite Automaton (FA). A FA is a fundamental entity in Computer Science used in several applications like lexical analysis, implementation of text editors, compilers etc. Thus, the implementation of a FA is well known. Since a DOFA only employs certain special rules to be invoked and conditions to be checked during the operation of the machine, it does not present any implementation difficulties not found in FA. Thus it can be safely asserted that computer implementation of the method presented is straightforward.

Figure 15:
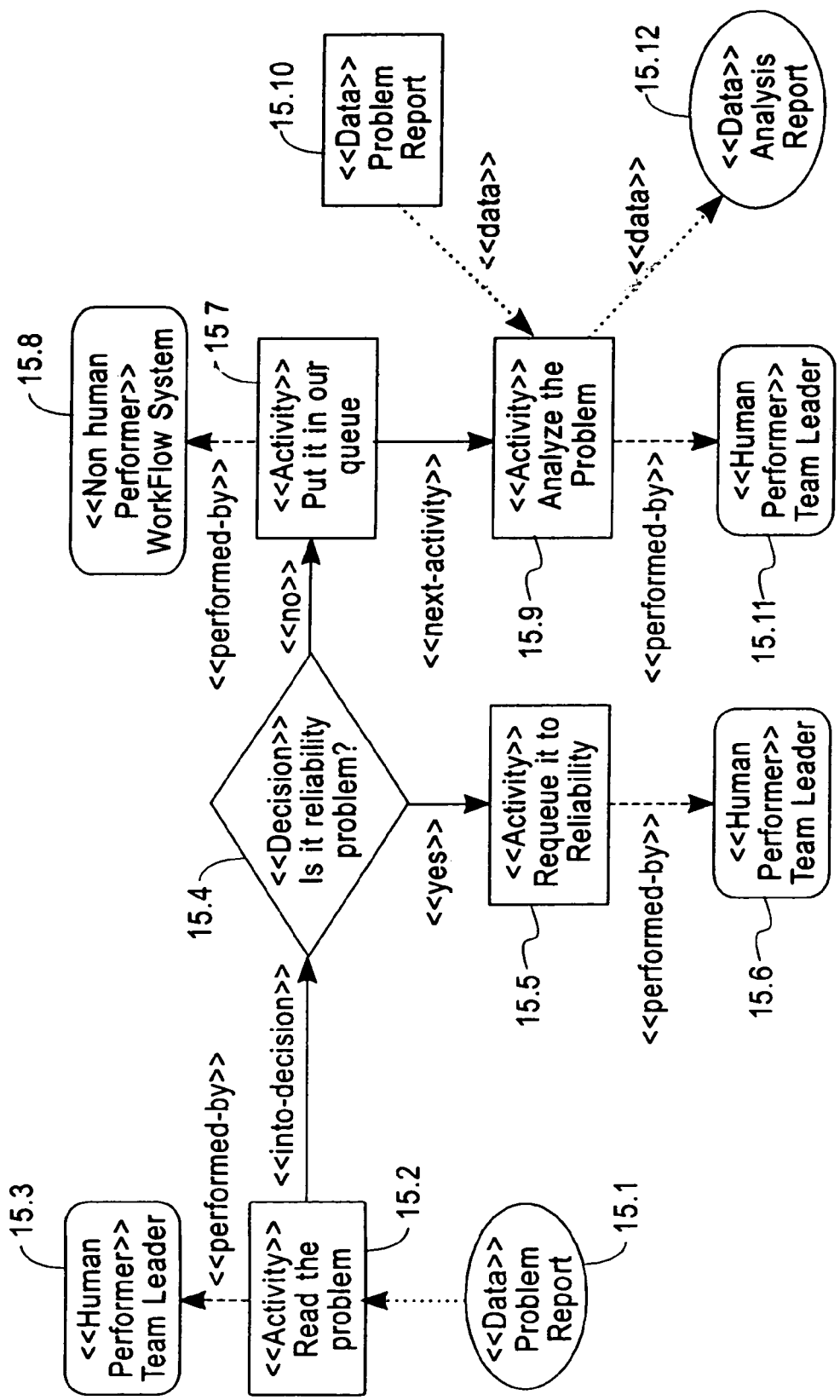
FIG. 15 shows a simple workflow diagram for Problem Analysis in Software Support Processes, as taken in Appendix A

Worked Example:

FIG. 15 shows a worked example illustrating the construction of the Generalization Machine using the Generalization Mechanism and one example illustrating the construction of the Specialization Machine for a negative feature.

Consider that the user gives the following model as a positive example to the system and that this is the first example.

Let us say that while collecting examples, the following symbols are assigned to the types.

Node Types:
    Activity→a
    Human Performer→b
    Non Human Performer→c
    Data→d
    Decision→e
Note that a<b<c<d<e
Edge Types:
    Next activity→α
    Performed by human performer→β
    Performed by non human performer→γ
    Data→χ
    Into decision→d
    Yes decision→φ
    No decision→η
Note that α<β<γ<χ<d<φ<η

The strings that are obtained from this model after the transformation are . . .

Node String: aaaabbbcddde
Edge Strings:
    (a, in, χ)
    (a, in, φ)
    (a, in, η)
    (a, in, αχ)
    (a, out, βd)
    (a, out, β)
    (a, out, αγ)
    (a, out, βχ)
    (b, in, β)
    (b, in, β)
    (b, in, β)
    (c, in, γ)
    (d, in, χ)
    (d, out, χ)
    (d, out, χ)
    (e, in, d)
    (e, out, φη)

The following are the languages to be developed now.
1. Node Language
2. In Edge Language for a
3. Out Edge Language for a
4. In Edge Language for b
5. Out Edge Language for b
6. In Edge Language for c
7. Out Edge Language for c
8..hi Edge Language for d
9. Out Edge Language for d
10. In Edge Language for e
11. Out Edge Language for e Since there are 5 node types, 2*5+1=11 languages are to be processed. Out of these languages, the Out Edge Languages for node types b and c (5 and 7 in the above list) can be neglected because there are no edges going out of nodes of this type. Therefore, 9 machines are to be developed to accept these languages. The Generalization Mechanism is now applied here for each machine. A detailed step by step procedure for one language is presented in the following table.

1. Language: Node Language. String: aaaabbbcddde

| Input tape when the dead end is reached | $M(Q, \Sigma, \delta, q_0, F)$ | Transition Graph before applying the rule and the rule that is applied. | Transition Graph after the application of the rule. |
|---|---|---|---|
| aaaabbbcddde | $Q = \{q_0\}$<br>$\Sigma = \{\}$<br>$F = \{\}$ | Apply rule I<br> | 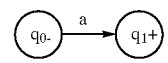 |
| aaaabbbcddde | $Q = \{q_0, q_1\}$<br>$\Sigma = \{a\}$<br>$F = \{q_1\}$ | Apply rule IIb<br>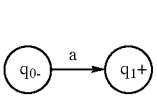 | 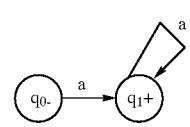 |
| aaaabbbcddde | $Q = \{q_0, q_1\}$<br>$\Sigma = \{a\}$<br>$F = \{q_1\}$ | Apply rule IIa<br>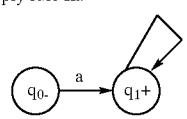 | 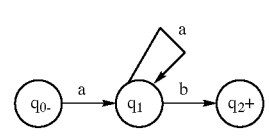 |

-continued

| Input tape when the dead end is reached | $M(Q, \Sigma, \delta, q_0, F)$ | Transition Graph before applying the rule and the rule that is applied. | Transition Graph after the application of the rule. |
|---|---|---|---|
| aaaabbbcddde | $Q = \{q_0, q_1, q_2\}$<br>$\Sigma = \{a, b\}$<br>$F = \{q_2\}$ | Apply rule IIb | |
| aaaabbbcddde | $Q = \{q_0, q_1, q_2\}$<br>$\Sigma = \{a, b\}$<br>$F = \{q_2\}$ | Apply rule IIa | |
| aaaabbbcddde | $Q = \{q_0, q_1, q_2, q_3\}$<br>$\Sigma = \{a, b, c\}$<br>$F = \{q_3\}$ | Apply rule IIa | |
| aaaabbbcddde | $Q = \{q_0, q_1, q_2, q_3, q_4\}$<br>$\Sigma = \{a, b, c, d\}$<br>$F = \{q_4\}$ | Apply rule IIb | |
| aaaabbbcddde | $Q = \{q_0, q_1, q_2, q_3, q_4, q_5\}$<br>$\Sigma = \{a, b, c, d\}$<br>$F = \{q_4\}$ | Apply rule IIa | |

So the node language developed is
Q{$q_0, q_1, q_2, q_3, q_4, q_5$}
$\Sigma$={a, b, c, d, e}
F={$q_5$}
The transition function can be learnt from the following final transition graph.

The strings and final machine definition for the remaining languages are given below:

2. Language: In Edge Language for Node Type a
The strings are
1. $\chi$
2. $\phi$
3. $\eta$
4. $\alpha\chi$
With these strings, the Generalization Mechanism produces the following DOFA.
Q={$q_0, q_1, q_2, q_3, q_4$}
$\Sigma$={$\alpha,\chi,\phi,\eta$}
F={$q_4$}
The transitions are as given in the following transition diagram.

The sequence of rules that are applied are . . .
1. I
2. IV
3. IIa
4. IV
5. IIa
6. IIIa 3. Language: Out Edge Language for Node Type a
The strings are
1. $\beta$d
2. $\beta$
3. $\alpha\gamma$
4. $\beta\chi$
With these strings, the Generalization Mechanism produces the following DOFA.
Q={$q_0, q_1, q_2, q_3, q_4, q_5$}
$\Sigma$={,$\alpha,\beta,\gamma,\chi$,d}
F={$q_5$}
The transitions are as given in the following transition diagram.

4. Language: In Edge Language for Node Type b
The strings are
1. $\beta$
2. $\beta$
3. $\beta$
With these strings, the Generalization Mechanism produces the following DOFA.
Q={$q_0, q_1$}
$\Sigma$={$\beta$}
F={$q_1$}
The transitions are as given in the following transition diagram.

5. Language: Out Edge Language for Node Type b
There are no strings for this language and hence the machine is
Q={$q_0$}
$\Sigma$={ }
F={ }
The transitions are as given in the following transition diagram.

6. Language: In Edge Language for Node Type c
The strings are
1. $\gamma$
With these strings, the Generalization Mechanism produces the following DOFA.
Q={$q_0, q_1$}
$\Sigma$={$\gamma$}
F={$q_1$}
The transitions are as given in the following transition diagram.

7. Language: Out Edge Language for Node Type c
There are no strings for this language and hence the machine is
Q={$q_0$}
$\Sigma$={ }
F={ }
The transitions are as given in the following transition diagram.

8. Language: In Edge Language for Node Type d
The strings are
1. $\chi$
With these strings, the Generalization Mechanism produces the following DOFA.

$Q=\{q_0, q_1\}$
$\Sigma=\{\chi\}$
$F=\{q_1\}$
The transitions are as given in the following transition diagram.

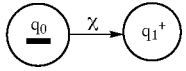

9. Language: Out Edge Language for Node Type d
The strings are
1. $\chi$
2. $\chi$
With these strings, the Generalization Mechanism produces the following DOFA.
$Q=\{q_0, q_1\}$
$\Sigma=\{\chi\}$
$F=\{q_1\}$
The transitions are as given in the following transition diagram.

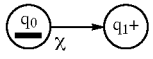

10. Language: In Edge Language for Node Type e
The strings are
1. d
With these strings, the Generalization Mechanism produces the following DOFA.
$Q=\{q_0, q_1\}$
$\Sigma=\{d\}$
$F=\{q_1\}$
The transitions are as given in the following transition diagram.

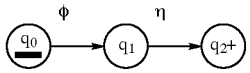

11. Language: Out Edge Language for Node Type e
The strings are
1. $\phi\eta$

With these strings, the Generalization Mechanism produces the following DOFA.
$Q=\{q_0, q_1, q_2\}$
$\Sigma=\{\phi,\eta\}$
$F=\{q_2\}$
The transitions are as given in the following transition diagram.

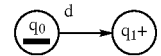

This is just the first example given to the system. A complete definition for a modeling environment requires the user to provide a sufficient number of varied examples.

The following is a negative example for building the Specialization Machine.

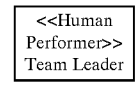
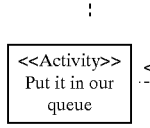
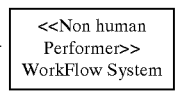

The string produced here is (a, out, $\beta\gamma$)
The Specialization Machine constructed for this language is therefore
$M_S(Q, \Sigma, q_0, \delta, F)$ where . . .
$Q=\{q_0, q_1, q_2\}$
$\Sigma=\{\beta,\gamma\}$
$F=\{q_2\}$
The transition diagram is as follows.

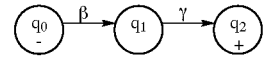

During production $M_S$ has the s-bypass condition that can be applied, and in this way, it will become very much different from $M_G$. So, the Out Edge Language for Node Type a, after the Specialization is made would took as follows.

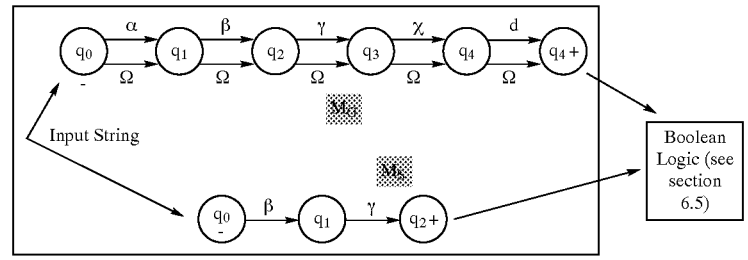

Complete machine for out edge language for node type 'a'

What is claimed is:
1. A computer-implemented method for generating a workflow metamodel, wherein the metamodel describes a class of workflow models and includes a number of finite automata stored on a computer readable storage medium, the method comprising:
- a) extracting information from example workflow models, including:
  - generating nodes and edges for the example workflow models, wherein such nodes have respective types, the type of such a node showing occurrence of data, an activity or a decision, and wherein such an edge connects two of the nodes and shows a sequence of occurrence of the data, activities or decisions of the two connected nodes;
  - generating node strings for the respective ones of the example workflow models, wherein the node strings have characters and the characters of such a node string show occurence of respective ones of the nodes;
  - generating edge strings for the respective nodes of the respective example workflow models, wherein the edge strings have characters and the characters of such an edge string show occurence of edges connected to the edge string's respective one of the nodes; and
- b) generating a workflow metamodel for a class of such example workflow models, wherein the generating is responsive to the information extracted in a) and the class includes all the example workflow models, and wherein the generating of the workflow metamodel includes:
  - generating finite automata; and
  - storing the finite automata on a computer readable storage medium, wherein the finite automata correspond to respective ones of the strings and the generating of such a finite automaton is in response to its corresponding string.

2. The method as claimed in claim 1, wherein the generating of the nodes and edges of the example workflow models includes:
assigning a unique id to each said node and edge, and ordering said ids in a defined sequence.

3. The method as claimed in claim 1, wherein the example workflow models include positive examples workflow models, wherein such a positive example workflow model provides an instance of correct workflow model behaviour.

4. The method as claimed in claim 3, wherein the example workflow models include negative example workflow models, wherein such a negative example workflow model provides an instance of incorrect workflow model behaviour.

5. The method as claimed in claim 3, wherein the generating of the finite automata includes generating, in response to the strings of said positive example workflow models, a first set of finite automata.

6. The method as claimed in claim 5, wherein the example workflow models include negative example workflow models, wherein such a negative example workflow model provides an instance of incorrect workflow model behaviour, and wherein the generating of the finite automata includes generating, in response to the strings of said negative example workflow models, a second set of finite automata.

7. A system for generating a metamodel, wherein the metamodel describes a class of models and includes a number of finite automata stored on a computer readable storage medium, the system comprising:
first means for extracting information from example models, wherein the means for extracting information i) generates nodes and edges for the example models, and wherein such an edge connects two of the nodes and shows a sequence of occurrence of the two connected nodes, ii) generates node strings for the respective ones of the example models, wherein the node strings have characters, and the characters of such a node string show occurence of respective ones of the nodes, and iii) generates edge strings for the respective nodes of the respective example models, wherein the edge strings have characters, and the characters of such an edge string show occurence of edges connected to the edge string's respective one of the nodes; and
second means for generating a metamodel for a class such example models, wherein the generating is responsive to the information extracted by the first means and the class includes all the example models, and wherein the second means generates finite automata and stores the finite automata on a computer readable storage medium, wherein the finite automata correspond to respective ones of the strings and the generating of such a finite automaton is in response to its corresponding string.

8. The system as claimed in claim 7, wherein the generating of the nodes and edges of the example models includes assigning a unique id to each said node and edge, and ordering said ids in a defined sequence.

9. The system as claimed in claim 7, wherein the example models include positive example models, wherein such a positive example model provides an instance of correct model behaviour.

10. The system as claimed in claim 9, wherein the example models include negative example models, wherein such a negative example model provides an instance of incorrect model behaviour.

11. The system as claimed in claim 9, wherein the generating of the finite automata includes generating, in response to the string of said positive example models, a first set of finite automata.

12. The system as claimed in claim 11, wherein the example models include negative example models, wherein such a negative example model provides an instance of incorrect model behaviour, and wherein the generating of the finite automata includes generating, in response to the string of said negative example models a second set of finite automata.

13. A computer program product comprising computer readable program code stored on computer readable storage medium which when executed generates a metamodel, wherein the metamodel describes a class of models and includes a number of finite automata stored on the computer readable storage medium, the computer program product comprising:
first computer readable program code means configured for extracting information from example models, including the first computer readable program code means being configured for i) generating nodes and edges for the example models, and wherein such an edge connects two of the nodes and shows a sequence of occurrence of the two connected nodes, ii) generating node strings for the respective ones of the example models, wherein the node strings have characters, and the characters of such a node string show occurence of respective ones of the nodes, and iii) generating edge strings for the respective nodes of the respective example models, wherein the edge strings have characters, and the characters of such an edge string show occurence of edges connected to the edge string's respective one of the nodes; and second computer readable program code means configured for generating a metamodel for a class of such models, wherein the generating is responsive to the information extracted by the first computer readable program code means, and the class includes all the example models, and wherein being configured for generating the metamodel includes being configured for generating finite automata and storing the finite automata on a computer readable storage medium, wherein the finite automata correspond to respective ones of the strings an the generating of such a finite automaton is in response to its corresponding string.

14. The computer program product as claimed in claim 13, wherein the generating of the nodes and edges of the example models includes assigning a unique id to each said node and edge, and ordering said ids in a defined sequence.

15. The computer program product as claimed in claim 13, wherein the example models include positive example models, wherein such a positive example model provides an instance of correct behaviour.

16. The computer program product as claimed in claim 15, wherein the example models include negative example models, wherein such a negative example model provides an instance of incorrect behaviour.

17. The computer program product as claimed in claim 15, wherein the generating of the finite automata includes generating, in response to the string of said positive example models a first set of finite automata.

18. The computer program product as claimed in claim 17, wherein the example models include negative example models, wherein such a negative example model provides an instance of incorrect model behaviour, and wherein the generating of the finite automata includes generating, in response to the string of said negative example models a second set of finite automata.

* * * * *

UNITED STATES PATENT AND TRADEMARK OFFICE
CERTIFICATE OF CORRECTION

PATENT NO. : 6,988,062 B2  Page 1 of 1
APPLICATION NO. : 09/957163
DATED : January 17, 2006
INVENTOR(S) : Deepak Minakanagurki Srinivasa It is certified that error appears in the above-identified patent and that said Letters Patent is hereby corrected as shown below:

Col. 9 line 22, as set out in the printed patent, which reads "5. FQ. is the set of final states." should read -- 5. $F \subseteq Q$, is the set of final states. --.

Col. 9, line 25, as set out in the printed patent, which reads "... if qδQ & w ϵ Σ* ..." should read -- if $q \in Q$ & $w \in \Sigma^*$ --.

Col. 9 line 28, as set out in the printed patent, which reads "∀p, qϵQ, p<q iff∃wϵΣ*|δ`ϱ(q, w)=p." should read -- $\forall p, q \in Q, p<q$ iff$\cancel\exists w \in \Sigma^*|\delta\grave{\ }(q, w) = p$.

Col. 9 line 31, as set out in the printed patent, which reads "... iff p<q & ∃rϵQ|p<r<q" should read -- iff $p<q$ & $\cancel\exists r \in Q|p<r<q$ --.

Col. 9 line 32, as set out in the printed patent, which reads "... iff p<q & ∃rϵQ|p<r<q" should read -- iff $p<q$ & $\cancel\exists r \in Q|p<r<q$ --.

Col. 9 line 42 The 2nd line of claim 3, as the claim is set out in the printed patent, which reads "... include positive examples workflow..." should read -- include positive example workflow --.

Signed and Sealed this

Twenty-sixth Day of February, 2008

JON W. DUDAS
*Director of the United States Patent and Trademark Office*